June 24, 1969   Q. C. TURTLE   3,452,264

SPEED CONTROLLER FOR ELECTRIC MOTORS

Filed May 10, 1967

*INVENTOR.*
QUENTIN C. TURTLE

BY *Dodge and Sons*

ATTORNEYS

United States Patent Office 3,452,264
Patented June 24, 1969

3,452,264
SPEED CONTROLLER FOR ELECTRIC MOTORS
Quentin C. Turtle, Cranston, R.I., assignor to General Signal Corporation, a corporation of New York
Filed May 10, 1967, Ser. No. 637,594
Int. Cl. H02p 5/16
U.S. Cl. 318—245      1 Claim

ABSTRACT OF THE DISCLOSURE

A speed controller for a DC or universal electric motor employing an SCR which is triggered by a unijunction transistor. High frequency voltage transients are suppressed by a resistor in the cathode circuit of the SCR, a capacitor which is connected across the elements of the control circuit, and by a diode-capacitor combination which is connected with base (2) of the transistor.

Background and summary of the invention

This invention relates to solid state speed controllers for DC or universal electric motors.

A known controller of this kind employs a silicon controlled rectifier (hereinafter termed SCR), which controls current flow through the motor, and a unijunction transistor whose firing time is controlled by an R-C timing circuit and which serves to trigger the SCR. Since the transistor and SCR used in the controller respond very rapidly to voltage changes, electrical noise (i.e., high frequency voltage transients) can cause erratic operation. Experience indicates that the performance of the controller is satisfactory only in cases where the mechanical load on the motor is relatively constant, and consequently the impedance imposed on the circuit is primarily resistive. In cases where the load varies between wide limits, the noise produced by the highly inductive impedance encountered under low loading conditions combines with the inherent armature or commutator noise to cause false firing of the transistor and the SCR. Obviously this condition limits considerably the utility of the controller.

The object of this invention is to provide an improved version of the known unijunction transistor-SCR controller which performs satisfactorily over the entire loading range, i.e., between no load and full load conditions. In brief, the improvement consists in the addition of several critically located components which have the joint effect of filtering from the circuit those high frequency voltage transients which cause false firing of the solid state controlling elements.

Description of drawings

The invention is described herein in detail with reference to the accompanying drawing in which.

Detailed description of prior controller

Figure 1:
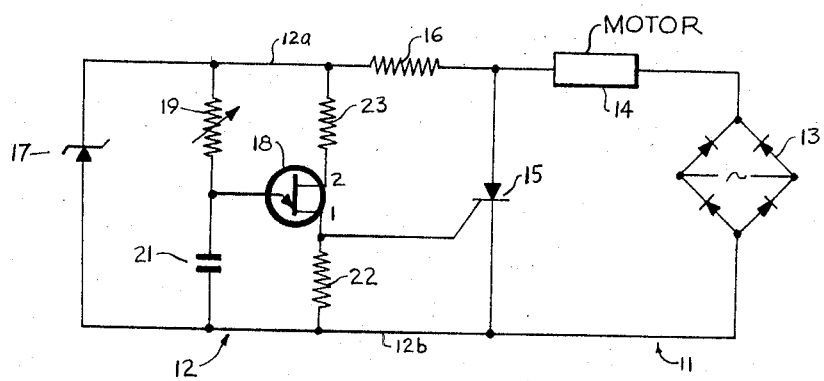
FIG. 1 is a schematic diagram of the known solid state controller.

Since the present invention concerns an improvement in the controller shown in FIG. 1, it is necessary to consider first the nature and deficiency of this known apparatus.

As shown in FIG. 1, the controller comprises a power circuit 11, and a control circuit 12. The power circuit includes a full wave rectifier bridge 13 which is supplied from an AC source (not shown), a shunt or series wound DC or universal motor 14 which is connected with the positive terminal of bridge 13, and an SCR 15. Control circuit 12 is connected across the anode and cathode of SCR 15, and its positive bus 12a is provided with a resistor 16 which serves to limit the current flow through a Zener diode 17. This diode regulates the voltage applied to a pair of parallel connected branch leads containing, respectively, unijunction transistor 18 and the resistance and capacitance elements 19 and 21 of an R-C timing circuit. Base 1 of transistor 18 is connected with the gate of SCR 15, and is connected with negative bus 12b through a resistor 22 sized to provide the voltage drop necessary to fire the SCR. Base 2, on the other hand, is connected with the positive bus 12a through a current-limiting resistor 23.

Capacitor 21 in the timing circuit charges during each half cycle of the AC power supplied to bridge 13. When the voltage across the capacitor rises to the threshold firing level of transistor 18, a fast voltage pulse is generated across resistor 22 and this, in turn, fires SCR 15. Once SCR 15 becomes conductive, the voltage drop across it reduces to zero. Therefore, during the balance of the half cycle, motor 14 receives the full output voltage of bridge 13.

The amount of energy delivered to motor 14 during each half cycle depends upon how quickly the charge on capacitor 21 increases to the threshold level of transistor 18, since this governs the length of time that SCR 15 is conductive. Inasmuch as all of the energy in circuit 12 is dissipated as soon as SCR 15 fires, it follows that the point in each half cycle at which the capacitor charge reaches the threshold value depends solely upon the resistance afforded by variable resistor 19. If this resistance is a minimum, the threshold level will be reached very early, and consequently the terminal voltage of bridge 13 will be applied to motor 14 throughout substantially the entire length of each half cycle. Therefore, motor 14 will run at maximum speed. As the resistance afforded by resistor 19 is progressively increased, a progressively longer portion of each half cycle will be required in order to develop the threshold voltage of transistor 18. Therefore, motor 14 will receive a progressively decreasing amount of energy per unit of time, and its speed will decrease. The relationship between motor speed and the resistance of resistor 19 is substantially linear and, when the resistance is a predetermined maximum, the motor will stop.

The FIG. 1 controller operates in the manner just described only as long as the impedance imposed on it by motor 14 is essentially resistive. In cases where the motor 14 is unloaded, or is driving a light load, the impedance becomes highly inductive and the controller is subjected to high frequency, high amplitude transient voltages. These transient voltages, or noise as they are commonly called, cause false firing of transistor 18 and SCR 15 and destroy the proportional speed control characteristic of the controller. This disadvantage is eliminated by the improved controller shown in FIG. 2.

Description of the preferred embodiment

Figure 2:
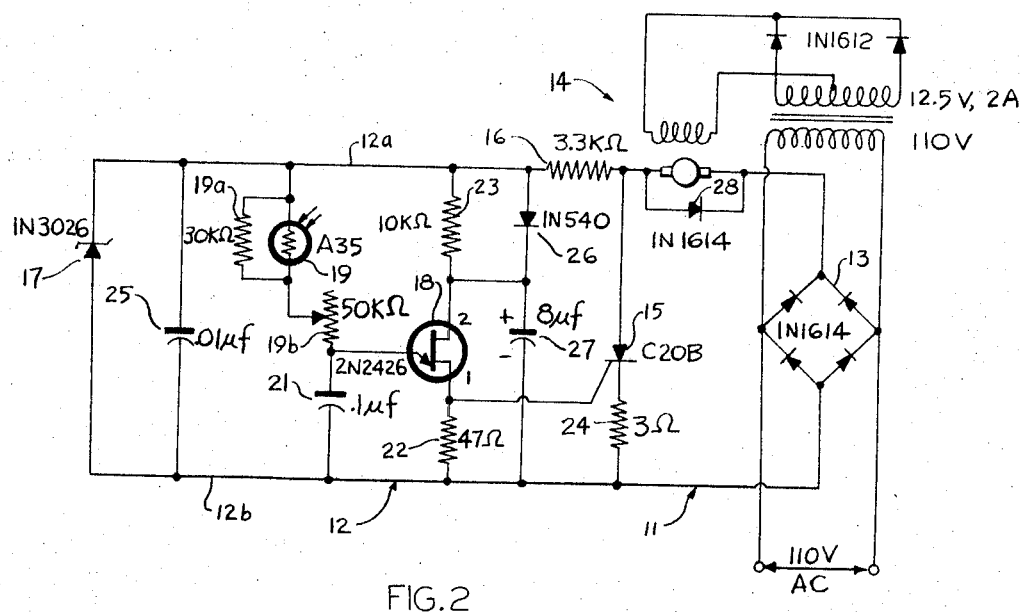
FIG. 2 is a schematic diagram of the preferred controller embodying the teachings of this invention.

The improved controller shown in FIG. 2 employs basically the same circuits as the prior controller just described, but includes four critically placed elements which suppress the undesirable voltage transients. The first of these elements is a resistor 24 which is interposed in the connection between the cathode of SCR 15 and the negative terminal of bridge 13, and which provides a bias in the triggering circuit of SCR 15. While the control signal developed across resistor 22 is strong enough to overcome this bias and still fire the SCR, many of the noise signals are not. Therefore, in effect, resistor 24 acts as a filter for these undesirable signals. The second noise-suppression element is a capacitor 25 which is connected across buses 12a and 12b. This element reduces the time rate of change of voltage across control circuit 12 and tends to preclude false firing of the circuit components which are sensitive to fast rise time noise. The final two noise-suppression elements are diode 26 and capacitor 27 which are connected between base 2 of transistor 18 and the buses 12a and 12b, respectively. These components act together to prevent rapid changes in the voltage at base 2, and thus they tend to insure that transistor 18 will fire only upon receipt of a control signal from the R-C timing circuit. The combined effects of these four noise-suppression elements is such that the FIG. 2 controller will operate satisfactorily even when motor 14 is running under light or no load conditions.

Since diode 26 in the FIG. 2 controller provides a flow path from bus 12a to base 2 of transistor 18, it might be expected that the parallel path through resistor 23 can be eliminated. However, actual experience with the controller shows that this is not the case. For some reason which I cannot explain adequately, the connection through resistor 23 is required in order to prevent erratic operation of motor 14.

The improved controller can be used in many different installations, but the one chosen for illustration is particularly suitable for use in the Model 31–12 Gravimetric Loss-In-Weight Feeder manufactured by the BIF Unit of General Signal Corporation. This version uses a shunt wound universal motor Model VZIR manufactured by the Universal Electric Company of Owosso, Mich., which drives the helix feeding mechanism, and which is equipped with a freewheeling or noise suppression diode 28 which serves to dissipate stored inductive energy. The variable resistor 19 is a photocell whose resistance varies inversely with the degree of illumination, and which is incorporated in a device for sensing changes in the position of the scale beam of the feeder. Photocell 19 is provided with a shunt resistor 19a and a series-connected potentiometer 19b. Resistor 19a establishes the minimum speed for motor 14 and is so sized that, when photocell 19 is illuminated the minimum amount permitted by the illumination control device, the charge on capacitor 21 will reach the threshold level of transistor 18 just before, or exactly at, the end of each half cycle of the AC power. In other words, resistor 19a insures that motor speed will vary with the degree of illumination of photocell 19 at low levels of illumination. Potentiometer 19b, on the other hand, is included so that that maximum speed of motor 14 can be varied to suit the needs of the user.

Although the illustrated controller employs a full wave rectifier 13 and a shunt motor 14, it should be realized that the invention can be applied to controllers employing half wave rectifiers or series motors.

I have described herein one particular embodiment of my inventive concept, but it will be understood that the following claim provides the true measure of the scope of that concept.

I claim:
1. In a speed controller for a universal or DC electric motor of the type including a power circuit (11) containing an AC rectifier (13), a motor (14) connected with the positive terminal of the AC rectifier, and a controlled rectifier (15) whose anode and cathode are connected, respectively, with the motor and the negative terminal of the AC rectifier; and a control circuit (12) comprising a positive side (12a) connected with the anode of the controlled rectifier through a current-limiting resistor (16), a negative side (12b) connected with the negative terminal of the AC rectifier, a Zener diode (17) connected between said sides, a unijunction transistor (18) whose base 1 is connected with the gate of the controlled rectifier, a variable resistor (19) and a capacitor (21) connecting the emitter of the transistor with the positive and negative sides, respectively, and a pair of resistors (23, 22) connecting bases 2 and 1 of the transistor with the positive and negative sides, respectively; the improvement which comprises:
  (a) a biasing resistor (24) interposed in the connection between the cathode of the controlled rectifier and the negative terminal of the AC rectifier;
  (b) a capacitor (25) connected between said positive and negative sides;
  (c) a diode (26) connected between said positive side and base (2) of the transistor and providing a parallel path to that base; and
  (d) a capacitor (27) connected between base (2) of the transistor and said negative side.

References Cited
UNITED STATES PATENTS 3,177,417  4/1965  Wright.
3,248,643  4/1966  Lawson.
3,257,595  6/1966  Polakowski _____ 318—341

ORIS L. RADER, *Primary Examiner.*

K. L. CROSSON, *Assistant Examiner.*

U.S. Cl. X.R.

323—36; 318—341